Sept. 20, 1932.    C. M. HAMSHAW    1,878,442
ROTARY GARDEN CULTIVATOR
Original Filed June 20, 1929
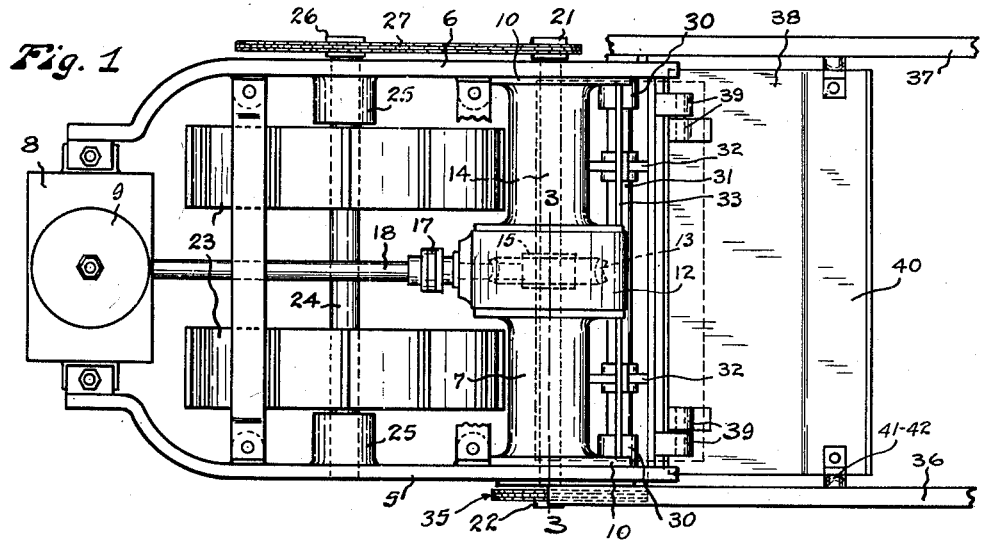
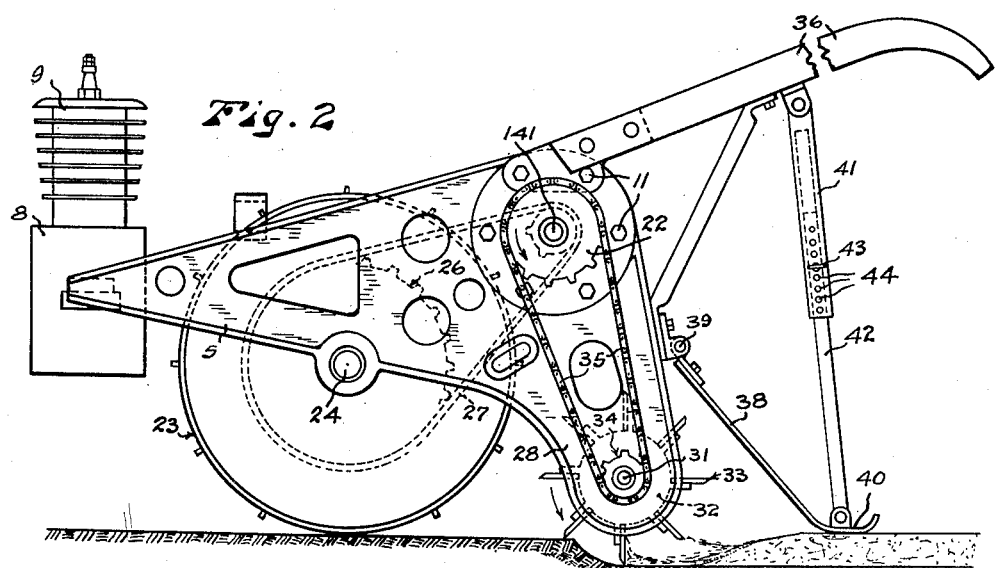
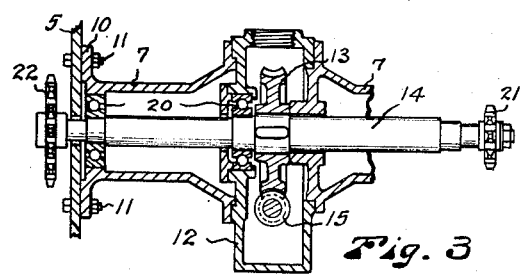
INVENTOR
Clarence M. Hamshaw
BY
Fred C. Matheny
ATTORNEY Patented Sept. 20, 1932

1,878,442

UNITED STATES PATENT OFFICE

CLARENCE M. HAMSHAW, OF CHICAGO, ILLINOIS, ASSIGNOR OF ONE-TENTH TO MRS. H. W. GOODE

ROTARY GARDEN CULTIVATOR

Application filed June 20, 1929, Serial No. 372,270. Renewed April 19, 1932.

My invention relates to improvements in garden cultivators and the general object of my invention is to provide a garden cultivator of simple and efficient construction in which a multiple blade, motor driven, rotor is employed for cultivating the soil.

Another object is to provide a garden cultivator employing a multiple blade driven rotor which will produce a shallow yet thorough cultivation of the soil and destroy all weeds in its path and yet leave the roots of plants which are being cultivated undisturbed.

Another object is to provide a garden cultivator of this nature in which the rotor and the cultivator wheels are interconnected by driving mechanism which drives the rotor at a greater peripheral speed than the wheels and which compels the cultivator to move at the peripheral speed of the driving wheels thus permitting the force of the rotor to be applied in the proper direction for driving the cultivator forward but preventing the cultivator from being driven at the peripheral speed of the rotor as might otherwise occur if the wheels and the rotor were not interconnected.

Another object is to provide a cultivator of this nature having a soil guard and leveling device adjustably supported to the rear of the rotor, said soil guard also serving as a means for regulating the depth of cut of the rotor.

Other objects are to provide a garden cultivator of this nature which is strong and substantial in construction, efficient in operation, easy to handle and relatively cheap to manufacture.

Other and more specific objects will be apparent from the following description taken in connection with the accompanying drawing.

In the drawing Figure 1 is a plan view of a garden cultivator constructed in accordance with my invention.

Fig. 2 is a side elevation of the same.

Fig. 3 is a fragmentary sectional view on broken line 3—3 of Fig. 1, showing parts of the jack shaft and driving mechanism.

Referring to the drawing, throughout which like reference numerals designate like parts, 5 and 6 designate two side frame members which are supported in spaced apart parallel relation by means including a transverse jack shaft housing 7 and a motor crank case 8. A motor 9, which may be of the internal combustion type is mounted on the crank case 8. Said crank case 8 is securely bolted between the forward ends of the side frames 5 and 6 which converge as shown in Fig. 1, and the jack shaft housing 7 is provided with flanges 10 at both ends, which are secured to the side frames 5 and 6 by bolts 11.

The jack shaft housing 7 has a gear case 12 mid way between its two ends, within which is disposed a worm gear 13 mounted on a jack shaft 14. A worm 15 is rotatably mounted within the gear case 12 and meshes with the worm gear 13 and said worm is connected by a clutch 17 with a shaft 18 which is driven by the motor 9. The jack shaft 14 is journaled in suitable bearings 20 within the jack shaft housing 7 and its two ends extend outwardly beyond the side frames 5 and 6 and are provided respectively with sprocket wheels 21 and 22.

The cultivator frame is supported on wheels 23 which are disposed inside of the side frame members 5 and 6 and are keyed or otherwise rigidly secured on a transverse axle 24 which is rotatably mounted in bearings 25 in said side frame members. A sprocket wheel 26 on one end of the axle 24 is connected by a link belt 27 with the sprocket wheel 21 on one end of the jack shaft 14 to afford a driving connection between the jack shaft and the cultivator wheels.

The side frames 5 and 6 are each tapered almost to a point at their front ends and are widened at their rear ends to afford downwardly extending portions 28 having bearing hubs 30 on their inner sides within which are journaled a transverse rotor shaft 31. A rotor which may be formed of two spaced apart disc members 32 connected with each other by a plurality, eight more or less, of blades 33 is secured on the rotor shaft 31 so that it may be driven by driving the shaft 31. This rotor is substantially the full width of the frame. The shaft 31 has a sprocket wheel 34 on one end, which is connected by a link belt 35 with the sprocket wheel 22 on the jack shaft 14 for driving the rotor. The gear ratio of the rotor drive is higher than the gear ratio of the wheel drive so that the peripheral speed of the rotor will be greater than the peripheral speed of the wheels thus causing each rotor blade to cut off a thin slice of dirt and discharge the same rearwardly at each revolution, as shown in Fig. 2. The fact that the drive for the rotor and the drive for the wheels are interconnected makes it impossible for the rotor to propel the cultivator at a speed in excess of the peripheral speed of the wheels.

The rotor may be made to cut as shallow as desired so as not to injure the roots of growing plants alongside of its path but it is obvious that all weeds and vegetation in the path of the rotor will be destroyed and a mulch of fine well cultivated soil left in the path of said rotor.

The blades of the rotor, traveling at a greater speed than the machine, will be self cleaning and will throw all dirt and trash to the rear and said blades will give a shallow even tillage of the soil which is superior to the tillage produced by a hoe.

Two handles 36 and 37 are secured to the frame members 5 and 6 and extend rearwardly therefrom in the usual manner to afford means by which the cultivator may be guided and handled.

For the threefold purpose of preventing an objectionable discharge of soil to the rear of the rotor, and of governing the depth of cut of said rotor, and of smoothing and leveling the soil behind said rotor, I provide a soil guard 38 which is hinged at its upper end, as at 39, to the frame and extends downwardly and rearwardly at an incline and is bent at its rear end to form a flattened portion 40 arranged to slide on the soil which has been thrown off of the rotor. The flattened rear end 40 of said soil guard is connected by telescoped rods 41 and 42 with the handles 36 and 37. The telescoped rods 41 and 42 are connected with each other by means of a pin 43 which passes through holes 44 in said rods and admits of quick and easy adjustment for the purpose of adjusting the depth of cut of the rotor. One pair of rods 41—42 may be provided at each side.

This cultivator is simple and compact in construction, is easy to handle and is adapted for a type of shallow surface cultivation, which, heretofore has been almost exclusively done with a hoe. The wheels being entirely within the frame make it possible to get very close to rows of plants with the rotor and said wheels being relatively small, only about fourteen inches in diameter keep the center of gravity of the machine very low so that the machine is very easy to handle and there is very little danger of it tipping over. The motor is preferably of the internal combustion type.

The foregoing description and accompanying drawing clearly disclose a preferred embodiment of my invention, but it will be understood that this disclosure is merely illustrative and that such changes in the invention may be made as are fairly within the scope and spirit of the following claims.

I claim:

1. A cultivator of the class described embodying a frame, wheels supporting said frame for movement over the ground, a multiple blade rotor mounted in the frame to the rear of the wheels and arranged to dig into the ground, a motor mounted on the forward end of said frame, driving means connecting the motor with said wheels and said rotor, handles extending rearwardly from the frame and a soil guard at the rear end of said rotor, said soil guard having a portion which rests on and slides over the freshly cultivated soil, and means for adjusting said soil guard vertically to govern the depth of cut of said rotor.

2. In a garden cultivator, a frame, a motor mounted thereon, a multiple blade rotor mounted on the frame and driven by the motor for cultivating the soil, a soil guard to the rear of said rotor and having a portion which rests on the ground and means for adjusting said soil guard to vary the depth of cut of said rotor.

3. In a garden cultivator, a frame supported on wheels for movement over the ground and having a pair of rearwardly extending handles, a motor on said frame, a multiple blade ground cultivating rotor mounted on the frame and having a driving connection with the motor, and a soil shield at the rear of said rotor pivoted to the frame and adjustably supported from the handles.

4. In a garden cultivator, a frame supported on wheels for movement over the ground, rearwardly extending handles on the frame for guiding the same, a motor mounted on the front end of said frame, a soil cultivating multiple blade rotor mounted at the rear end of said frame, means connected with said motor for driving said rotor and said wheels at a predetermined speed ratio, a soil shield pivoted to said frame and extending downwardly to the rear of said rotor, and means adjustably supporting the lower end of said shield from said handles.

5. A garden cultivator of the class described embodying two frame members supported in spaced apart parallel relation, a jack shaft housing extending between said frame members, a jack shaft in said housing, a motor supported between the front ends of said frame members, means including a shaft and worm transmission for establishing a driving connection between said motor and said jack shaft, wheels supporting said frame, a multiple blade rotor rotatably mounted in the lower rear portion of said frame, driving means connecting said jack shaft with said wheels and other driving means connecting said jack shaft with said rotor.

6. A garden cultivator of the class described embodying two frame members supported in spaced apart parallel relation, a jack shaft housing extending between said frame members, a jack shaft in said housing, a motor supported between the front ends of said frame members, means including a shaft and worm transmission for establishing a driving connection between said motor and said jack shaft, wheels supporting said cultivator for movement over the ground, driving means connecting said wheels and said jack shaft, handles extending rearwardly from the frame for guiding the cultivator, a multiple blade rotor mounted in the lower rear portion of said frame and driven from said jack shaft and a dirt guard supported in the rear of said rotor.

7. A garden cultivator embodying two frame members, transverse supports maintaining said two frame members in spaced apart parallel relation, a motor mounted between the forward ends of said frame members, a shaft driven by said motor and extending rearwardly therefrom, a jack shaft extending crosswise between said frame members, a housing for said jack shaft, worm gear means interconnecting said jack shaft and said driven shaft, a multiple blade rotor mounted for rotation on a transverse horizontal axis at the lower rear portion of said frame, chain drive means interconnecting said rotor and said jack shaft, wheels supporting said frame, and other chain drive means interconnecting said wheels and said jack shaft.

8. In a garden cultivator, two frame members of substantially triangular shape, supported in spaced apart parallel relation, a motor supported between the forward ends of said frame members, a shaft driven by said motor and extending rearwardly therefrom, a jack shaft extending crosswise between said frame members, worm gear means interconnecting said jack shaft and said driven shaft, a multiple blade rotor mounted for rotation on a transverse horizontal axis at the lower rear portion of said frame, chain drive means interconnecting said rotor and said jack shaft, wheels supporting said frame, other chain drive means interconnecting said wheels and said jack shaft, a dirt guard at the rear side of said rotor and handles at the rear extending rearwardly from said frame.

In testimony whereof I affix my signature.

CLARENCE M. HAMSHAW.